(12) United States Patent
Takahashi

(10) Patent No.: US 12,090,546 B2
(45) Date of Patent: Sep. 17, 2024

(54) MOLTEN METAL PURIFICATION DEVICE

(71) Applicant: Kenzo Takahashi, Shiroi (JP)

(72) Inventor: Kenzo Takahashi, Shiroi (JP)

( * ) Notice: Subject to any disclaimer, the term of this patent is extended or adjusted under 35 U.S.C. 154(b) by 0 days.

(21) Appl. No.: 17/905,138

(22) PCT Filed: Feb. 28, 2020

(86) PCT No.: PCT/JP2020/008541
§ 371 (c)(1),
(2) Date: Aug. 26, 2022

(87) PCT Pub. No.: WO2021/171623
PCT Pub. Date: Sep. 2, 2021

(65) Prior Publication Data
US 2023/0096536 A1    Mar. 30, 2023

(51) Int. Cl.
B22D 11/115    (2006.01)
B22D 11/119    (2006.01)
B22D 43/00     (2006.01)

(52) U.S. Cl.
CPC .......... B22D 11/115 (2013.01); B22D 11/119 (2013.01); B22D 43/00 (2013.01)

(58) Field of Classification Search
CPC ..... B22D 11/115; B22D 11/119; B22D 35/00; B22D 37/00; B22D 39/00; B22D 39/003; B22D 39/006; B22D 43/00
USPC ............ 164/134, 337, 147.1, 466, 502, 504; 75/10.67
See application file for complete search history.

(56) References Cited

U.S. PATENT DOCUMENTS

| 4,837,385 A | 6/1989 | Conti et al. |
| 4,967,827 A | 11/1990 | Campbell |
| 9,605,332 B2 | 3/2017 | Kennedy et al. |
| (Continued) | | |

FOREIGN PATENT DOCUMENTS

| CA | 3081826 A1 | 5/2019 |
| JP | 59-66968 A | 4/1984 |
| JP | 2007-21539 A | 2/2007 |
| (Continued) | | |

OTHER PUBLICATIONS

Machine translation of WO 2019/097799 A1 (Year: 2019).*

(Continued)

Primary Examiner — Kevin P Kerns
(74) Attorney, Agent, or Firm — Oblon, McClelland, Maier & Neustadt, L.L.P.

(57) ABSTRACT

A molten metal purification device for purifying molten metal flowing through a flow body having a flow path formed by a pair of opposed side walls and a bottom wall. The device includes internal and external members provided inside and outside the flow body, respectively. The internal member includes an electrode body provided inside the path made of a conductive member and has a pair of opposed electrodes provided in the path where current flows across the electrodes through the molten metal and a non-conductive filter. The external member is configured as a magnetic field device having an upper surface side magnetized to an N or S pole and disposed below the flow body. Lines of magnetic force coming out from the N pole or entering the S pole intersect with the current to generate Lorentz force for driving the molten metal along a flowing direction in the path.

10 Claims, 10 Drawing Sheets

(56) References Cited

U.S. PATENT DOCUMENTS

2020/0261970 A1    8/2020    Takahashi

FOREIGN PATENT DOCUMENTS

JP          2020-49528 A     4/2020
WO    WO 2019/097799 A1    5/2019

OTHER PUBLICATIONS

International Search Report Issued May 19, 2020, in PCT/JP2020/008541, filed on Feb. 28, 2020, 2 pages.
Australian Office Action dated Jul. 17, 2023, issued in Australian Patent Application No. 2020430989.
European Search Report dated Oct. 26, 2023, issued in European Patent Application No. 20921308.1.
El-Kaddah N et al., "The Electromagnetic Filtration of Molten Aluminum Using an Induced-Current Separator", JOM: Journal of Metals, Springer New York LLC, United States, May 1, 1995, pp. 46-49.
Canadian Office Action dated Sep. 29, 2023, issued in Canadian Patent Application No. 3,173,559.

* cited by examiner

MOLTEN METAL PURIFICATION DEVICE

TECHNICAL FIELD

The present invention relates to a molten metal purification device.

BACKGROUND ART

Conventionally, for example, cast products have been produced using molten metal having electrical conductivity (conductivity), that is, non-ferrous molten metal (e.g., Al, Cu, Zn, or Si, alloy including at least two of these, Mg alloy, or the like) or molten metal other than non-ferrous molten metal.

In order to obtain a cast product, for example, molten metal discharged from a melting furnace is guided by a gutter and poured into a mold in the next stage.

The molten metal often contains impurities. In such a case, it is necessary to remove the impurities to achieve purification. For the removal, so-called "filtration" using, for example, a filter has been conventionally performed.

SUMMARY OF THE INVENTION

Object of the Invention

The present inventor uniquely has had the following problems. The present inventor considers that those skilled in the art other than the present inventor do not have these problems and these problems are unique to the present inventor.

In order to increase the purification accuracy in the filtration, the mesh of the filter may be made as fine as possible. However, as the mesh becomes finer, the passing speed (filtration speed) at which the molten metal passes through the filter lowers, causing a problem that the productivity of the product lowers. In a case where a filter is used, a problem that clogging occurs is caused in addition to this problem. That is, in a case where a filter is used, clogging occurs in the filter itself, and the speed at which the molten metal M passes through the filter is also lowered by the clogging. As the clogging progresses, the molten metal eventually does not pass through the filter, and the operation cannot be continued. In order to avoid this, the filter may have a coarse mesh. However, this obviously leads to insufficient filtration of impurities, lowering the purification capability itself, and lowering the quality of the product made of the passing molten metal.

As described above, the present inventor has uniquely recognized that a purification method using a conventional filter has various technical problems as described above.

Moreover, the present inventor has uniquely concerned that a method using a conventional filter also has the following problems from the economical viewpoint. That is, the filter itself is very expensive. Nevertheless, clogging described above actually occurs in a short time due to use. For this reason, an old filter has to be frequently replaced with a new filter, and the old filter has to be discarded. Furthermore, during the replacement work, not only the profitability is lowered because the production of the product is stopped, but also the replacement work itself obviously is complicated and time-consuming work. Furthermore, conventionally, a clogged filter has to be thrown away (discarded) after use as described above and has poor economic efficiency. That is, in the conventional method, it is inevitable that the cost increases from various viewpoints.

As described above, unlike those skilled in the art other than the present inventor, the present inventor has uniquely had the above problems.

That is, in the method using a conventional filter to remove impurities from molten metal, not only the speed at which the molten metal passes through the filter lowers, but also efficient purification of the molten metal is practically difficult, and the filter needs to be frequently replaced, so that the work is complicated, and the productivity of the product is lowered due to these various reasons, and furthermore, the cost of the product produced using purified molten metal is increased owing also to the fact that the filter itself is expensive.

The present invention has been made in view of the unique problems of the present inventor, and an object thereof is to provide a molten metal purification device capable of improving the purification performance of molten metal, improving the productivity of products, and reducing the filtering cost.

Solution to Problem

The present invention is configured as
a molten metal purification device for purifying molten metal flowing through a molten metal flow body in which a flow path through which molten metal to be purified can flow is formed by a pair of side walls opposed to each other in a width direction and a bottom wall connecting the side walls,
the molten metal purification device including an internal member provided inside the molten metal flow body, and an external member provided outside the molten metal flow body,
in which the internal member includes:
an electrode body provided inside the flow path, the electrode body being made of a conductive member having an electric resistance value larger than an electric resistance value of molten metal to be purified, the electrode body having a pair of electrodes facing each other in a width direction of the molten metal flow body, a bottom wall connecting the electrodes, and a filter housing space formed by the pair of electrodes and the bottom wall in a state of being provided in the flow path, the electrode body being configured such that current can flow across the pair of electrodes through the molten metal to be purified; and
a non-conductive filter housed in the filter housing space, and
the external member is configured as a magnetic field device having an upper surface side magnetized to an N pole or an S pole, and is disposed below the molten metal flow body so that lines of magnetic force coming out from the N pole or lines of magnetic force entering the S pole intersect with the current to generate Lorentz force for driving the molten metal to be purified in a direction along a flowing direction in the flow path.

The present invention is configured as
a molten metal purification device for purifying molten metal flowing through a molten metal flow body in which a flow path through which molten metal to be purified can flow is formed by a pair of side walls opposed to each other in a width direction and a bottom wall connecting the side walls,
the molten metal purification device including an internal member provided inside the molten metal flow body, and an external member provided outside the molten metal flow body, in which the internal member includes:

an electrode body provided inside the flow path, the electrode body being made of a conductive member having an electric resistance value larger than an electric resistance value of molten metal to be purified, the electrode body including a pair of electrodes facing each other in a width direction of the molten metal flow body, a bottom wall connecting the electrodes, and the pair of electrodes in a state of being provided in the flow path, the electrode body being configured such that current can flow across the pair of electrodes through the molten metal to be purified; and a pair of non-conductive filters provided inside the flow path, the pair of non-conductive filters being provided at positions spaced apart from each other in a flow direction in the flow path so as to sandwich the electrode body, and the external member is configured as a magnetic field device having an upper surface side magnetized to an N pole or an S pole, and is disposed below the molten metal flow body so that lines of magnetic force coming out from the N pole or lines of magnetic force entering the S pole intersect with the current to generate Lorentz force for driving the molten metal to be purified in a direction along a flowing direction in the flow path.

The present invention is configured as a molten metal purification device for purifying molten metal flowing through a molten metal flow body in which a flow path through which molten metal to be purified can flow is formed by a pair of side walls opposed to each other in a width direction and a bottom wall connecting the side walls, the molten metal purification device including an internal member provided inside the molten metal flow body, and an external member provided outside the molten metal flow body, in which the internal member includes:

a non-conductive filter that is detachably provided inside the flow path and has a substantially rectangular shape, the filter being provided with an electrode housing space formed in each of both end faces respectively in contact with inner faces of the pair of side walls constituting the flow path to be partially recessed from the both end faces toward a center; and an electrode provided in the electrode housing space, and the external member is configured as a magnetic field device having an upper surface side magnetized to an N pole or an S pole, and is disposed below the molten metal flow body so that lines of magnetic force coming out from the N pole or lines of magnetic force entering the S pole intersect with the current to generate Lorentz force for driving the molten metal to be purified in a direction along a flowing direction in the flow path.

The present invention is configured as a molten metal purification device for purifying molten metal flowing through a molten metal flow body in which a flow path through which molten metal to be purified can flow is formed by a pair of side walls opposed to each other in a width direction and a bottom wall connecting the side walls, the molten metal purification device including an internal member provided inside the molten metal flow body, and an external member provided outside the molten metal flow body, in which the internal member is configured as a conductive filter, the filter including:

a pair of electrodes that also serves as a filter support frame at both ends in contact with inner faces of the pair of side walls constituting the flow path; and a conductive filter body supported in a state of being sandwiched between the pair of electrodes, and the external member is configured as a magnetic field device having an upper surface side magnetized to an N pole or an S pole, and is disposed below the molten metal flow body so that lines of magnetic force coming out from the N pole or lines of magnetic force entering the S pole intersect with the current to generate Lorentz force for driving the molten metal to be purified in a direction along a flowing direction in the flow path.

The present invention is configured as a molten metal purification device for purifying molten metal flowing through a molten metal flow body in which a flow path through which molten metal to be purified can flow is formed by a pair of side walls opposed to each other in a width direction and a bottom wall connecting the side walls, the molten metal purification device including an internal member provided inside the molten metal flow body, and an external member provided outside the molten metal flow body, in which the internal member includes:

a pair of electrodes configured to face each other in a width direction of the molten metal flow body in a state of being provided in the flow path so that current can flow through the molten metal to be purified; and a pair of non-conductive filters provided inside the flow path, the pair of non-conductive filters being provided at positions spaced apart from each other in a flow direction in the flow path so as to sandwich the pair of electrodes, and the external member is configured as a magnetic field device having an upper surface side magnetized to an N pole or an S pole, and is disposed below the molten metal flow body so that lines of magnetic force coming out from the N pole or lines of magnetic force entering the S pole intersect with the current to generate Lorentz force for driving the molten metal to be purified in a direction along a flowing direction in the flow path.

BRIEF DESCRIPTION OF DRAWINGS

FIG. 1b is an explanatory sectional view taken along line I(b)-I(b) in FIG. 1a.

FIG. 2b is an explanatory sectional view taken along line II(b)-II(b) in FIG. 2a.

FIG. 3b is an explanatory view of an end face taken along line III(b)-III(b) in FIG. 3a.

FIG. 4b is an explanatory sectional view taken along line IV(b)-IV(b) in FIG. 4a.

FIG. 5b is an explanatory sectional view taken along line V(b)-V(b) in FIG. 5a.

FIG. 6b is a side view of FIG. 6a.

FIG. 7b is a side view of FIG. 7a.

FIG. 8b is a side view of FIG. 8a.

FIG. 9b is a side view of FIG. 9a.

FIG. 10b is a side view of FIG. 10a.

BEST MODE FOR CARRYING OUT THE INVENTION

Figure 1A:
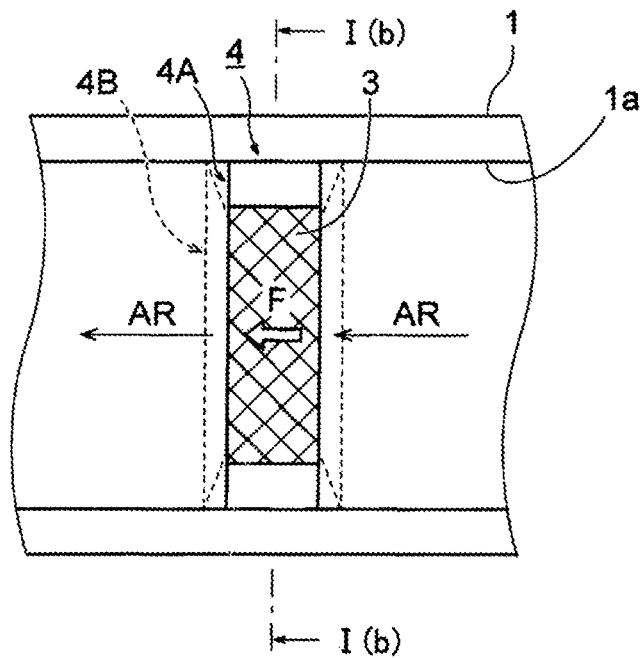
FIG. 1a is a plan view of a molten metal purification device according to a first embodiment of the present invention.

Before describing embodiments of the present invention, how only the present inventor has uniquely made the present invention will be described in order to facilitate understanding of the present invention.

Conventionally, when molten metal is passed through a filter, not only the speed of the molten metal passing through the filter decreases, but also the filter has to be replaced frequently due to clogging although the filter is expensive as described above. It seems that those skilled in the art other than the present inventor have had no doubt about these matters, but the present inventor has uniquely recognized that this is a major technical problem. For this reason, the present inventor has set a technical target to make it possible to prevent the speed at which the molten metal passes through the filter from being decreased and further increase the speed, to extend the life of the filter while maintaining the purification accuracy of the molten metal at a level of a conventional purification accuracy, and the like, and has uniquely continued various experiments and technical developments.

In the process, the inventor has observed in detail a number of used filters that have been replaced due to clogging and discarded so far. Thus, the present inventor has uniquely found the following.

That is, for example, a clogged filter having a thickness of, for example, 50 mm was observed. As a result, many non-conductive impurities (impurity particles) were trapped up to approximately 1 to 5 mm inside from the filter surface on the inflow side through which the molten metal flows into the filter, and the inflow side was severely clogged. On the other hand, at a portion 40 to 45 mm away from the surface on the inflow side, that is, on the outflow side, the impurity particles were hardly trapped, and substantially no clogging occurred. That is, the present inventor has uniquely found that clogging of the filter occurs in a concentrated manner on the inflow side of the filter and does not substantially occur on the outflow side.

Based on this unique knowledge, the present inventor has uniquely obtained technical insight that causing trapping of impurity particles to occur uniformly in the entire thickness from the inflow side to the outflow side of the filter would alleviate the clogging density of the filter, greatly extend the life of the filter, decrease the frequency of the replacement work, and further to make it possible to use the filter continuously for a long period of time. In order to confirm whether what has been obtained by this unique insight is technically correct or not, the inventor has further pushed the idea, actually made various devices, and repeated various experiments.

That is, the present inventor has first conceived a technical method of applying pressure to the entire molten metal by various general-purpose molten metal pumps or the like to pass the molten metal through the filter while pushing impurity particles deeper in the thickness direction of the filter. However, in this technical method, the present inventor has technically expected that, although the impurity particles can reach a deeper position of the filter to some extent, the speed at which the molten metal passes through the filter lowers and a practically satisfactory apparatus cannot be obtained. This is because the present inventor has technically expected that, in a case where the pump or the like is used, not only the molten metal but also the impurity particles are subjected to pressure, and thus the impurity particles strongly block the mesh of the filter, so that the molten metal is unlikely to pass through the mesh of the filter.

Therefore, the present inventor has further speculated and considered using Lorentz force instead of a pump as means for driving the molten metal. However, even if the Lorentz force is used, it is technically expected that impurity particles block the mesh of the filter and the molten metal cannot pass through the filter at a sufficient speed as in the case of using a pump.

The present inventor has uniquely conducted various experiments to confirm that this technical expectation would be practically correct. This is because there was also an expectation that some solution could be obtained through various experiments.

However, when the present inventor actually conducted an experiment of applying Lorentz force to molten metal passing through the filter, the molten metal passed through the filter at a faster rate than expected, contrary to expectation. In order to find out the reason thereof, the present inventor further repeated various experiments, analyses, and studies.

Thus, the present inventor has uniquely found the following. That is, since the molten metal from which impurity particles are to be removed has a high temperature, the molten metal contains self oxides, and these oxides are non-conductive. In addition, the proportion of impurities contained in the molten metal of these non-conductive oxides is high. Therefore, in a case where Lorentz force is applied to the molten metal, although the driving force is applied to the molten metal because the molten metal has conductivity, the driving force is not applied to the impurity particles contained therein because the impurity particles are non-conductive.

More specifically, when the molten metal is driven by the Lorentz force, impurity particles present therein also flow together with the molten metal and inevitably enter the filter.

Therefore, as a result, the impurity particles are dispersed uniformly in the thickness direction of the filter. However, no Lorentz force is directly applied to the impurity particles because they are non-conductive. Therefore, the impurity particles do not strongly block the mesh of the filter. In addition, Lorentz force is directly applied to the molten metal. Therefore, the molten metal passes through the filter without being directly affected by the impurity particles.

As described above, in order to prevent a decrease in the speed at which the molten metal passes through the filter, those skilled in the art other than the present inventor would first adopt a technical thought of using a pump. However, those skilled in the art other than the present inventor also expect that the intended object cannot be achieved by using a pump. Furthermore, those skilled in the art expect that the intended object cannot be achieved as in the case of using a pump, even if Lorentz force is applied instead of the pump. Therefore, those skilled in the art other than the present inventor would give up using Lorentz force to drive the molten metal. However, the present inventor has uniquely found from experiments performed uniquely by himself that, when the Lorentz force is used, it is possible to prevent a decrease in the speed at which the molten metal passes through the filter, and it is further possible to allow the molten metal to pass through the filter at a high speed, which is different from the expectation of those skilled in the art. Based on the knowledge uniquely obtained by the present inventor, the present inventor has uniquely made the present invention in which the molten metal is driven by Lorentz force, which cannot be adopted by those skilled in the art other than the present inventor.

As described above, a molten metal purification device according to an embodiment of the present invention has been obtained by unique experiments, analyses, and studies by the present inventor. According to this molten metal purification device, it has been confirmed that the following characteristics can be obtained as can be seen from the following description, while maintaining the impurity purification accuracy.
  (1) It is possible to avoid a decrease in the molten metal passing speed in the filter.
  (2) The filter can be repeatedly used by reproduction.
  (3) A commercially available filter can be used for manufacturing the molten metal purification device.

As described above, the technical idea of applying Lorentz force to the molten metal passing through the filter is a technical thought uniquely obtained by the present inventor through experiments, analyses, and studies, and is a technical thought that could have never been reached by those skilled in the art other than the present inventor, who did not perform various experiments performed by the present inventor.

Hereinafter, embodiments of the present invention will be described with reference to the drawings.

First Embodiment

Figure 1B:
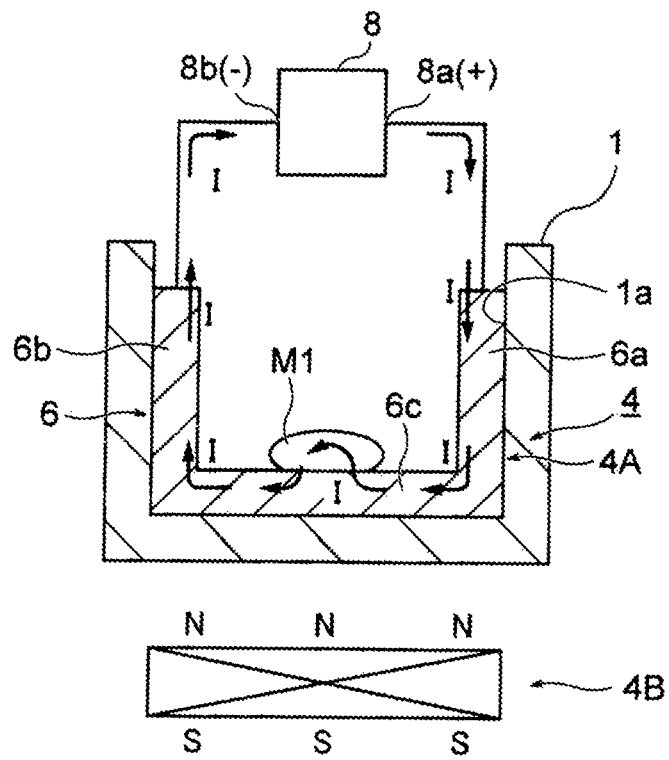

FIGS. 1a and 1b are respectively a plan view of a molten metal purification device according to a first embodiment of the present invention, and an explanatory sectional view taken along line I(b)-I(b) in FIG. 1a. The molten metal purification device is configured to purify molten metal such as aluminum.

Figure 1C:
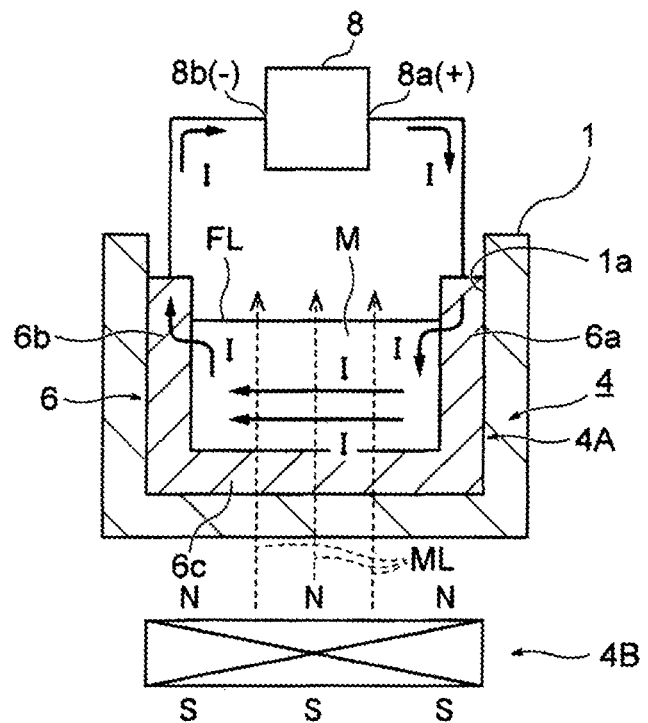
FIG. 1c is an explanatory view illustrating an aspect in which current I flows in the molten metal purification device according to the first embodiment of the present invention.

In FIG. 1a, the molten metal flows in a conveyance path (flow path) 1a of a molten metal conveyance gutter (molten metal flow body) I made of a refractory material in a direction of arrows AR from a molten metal source (not shown) such as a melting furnace on a right side in the figure toward a conveyance destination device (not shown) such as a casting device on a left side in the figure by a resultant force of gravity due to an inclination of the molten metal conveyance gutter 1 and Lorentz force F by a filter device 4. The flow speed at this time can be adjusted by the Lorentz force F. That is, a filter 3 can be passed without reducing the speed more than before, or while being further accelerated or decelerated than before. At this time, since the molten metal M is biased by the Lorentz force F, or based on the structure of the filter 3 itself, impurity particles are trapped over the entire thickness of the filter 3. In any case, the impurities are removed from the molten metal M in such a manner, and is sent to a conveyance destination device in the next stage. Note that FL in FIG. 1c shows an example of the liquid level height of the molten metal M to be treated by the molten metal purification device.

More specifically, as can be seen particularly from FIG. 1a, the filter device 4 which is active, that is, which has a capability of driving the molten metal is installed in the middle of the molten metal conveyance gutter 1. The filter device 4 has an internal member 4A provided inside the molten metal conveyance gutter 1, an external member 4B provided outside, and a power supply device 8 that supplies current I to the internal member 4A. In the filter device 4, the molten metal M can be driven in the arrow AR direction in FIG. 1a (or the opposite direction) by the Lorentz force F obtained by the cooperation of the internal member 4A and the external member 4B.

Figure 6A:
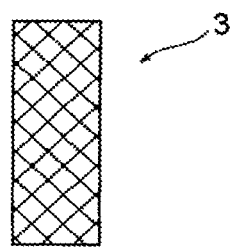
FIG. 6a is a plan view illustrating an example of a filter used in the first and second embodiments.
Figure 6B:
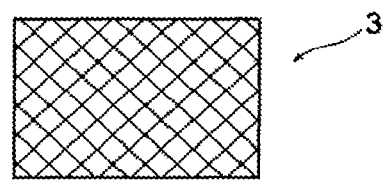

As can be seen particularly from FIG. 1b, the internal member 4A has an electrode body 6 of a substantially channel steel type that is detachably and closely embedded in the conveyance path 1a, and the filter 3 of a substantially plate shape that is further detachably installed in the electrode body 6. The electrode body 6 is obviously made of a material having conductivity. For example, as the conductive material constituting the electrode body 6, a material having heat resistance and fire resistance in addition to conductivity, such as graphite or titanium boride ($TiB_2$), can be adopted. Moreover, the filter 3 is made of a non-magnetic and non-conductive material such as ceramics. A plan view and an explanatory side view of this filter 3 are shown in FIGS. 6a and 6b.

As can be seen particularly from FIG. 1b, the electrode body 6 has a pair of side walls (electrodes) 6a and 6b facing each other in the width direction. The power supply device 8 is connected with the pair of side walls (electrodes) 6a and 6b. The power supply device 8 is configured to function as a DC current source or an AC current source with a variable current value and a variable voltage value. The power supply device 8 is configured to be switchable in polarity as a DC current source. Moreover, the power supply device 8 can also be configured to allow a pulse current, that is, a large current to flow instantaneously. As will be described later, the pulse current is useful when current flows in a direction opposite to the previous direction to change the direction of the Lorentz force so as to remove and separate the impurity particles once trapped in the filter from the filter. The power supply device 8 is configured to have a variable frequency as an AC current source, and can supply an AC current of 1 to 5 Hz or the like, for example.

As can be seen from the above description, the electrode body 6 also has a function as a so-called filter support that supports the filter 3. As described above, as can be seen particularly from FIG. 1b, the electrode body 6 is formed of a conductive material into a so-called channel steel shape having a substantially U-shaped cross section. The filter 3 is detachably housed in the internal space of the electrode body 6. Thus, the filter 3 can be replaced after use for a predetermined period or the like.

The electrode body 6 is made of a material such as aluminum having an electric resistance value larger than the electric resistance value of the target molten metal in order to automatically switch (bypass) the flow path of the current I depending on the presence or absence of the molten metal M. That is, the types of all the target molten metal M may be specified in advance, and a material having an electric resistance value larger than the electric resistance value of all the molten metal M may be selected. Thus, for example, as shown by the liquid level FL in FIG. 1c, when a sufficient amount of molten metal flows in the molten metal conveyance gutter 1 (that is, when a sufficient amount of molten metal is present in the molten metal conveyance gutter 1), the current I consequently flows through the flow path as illustrated in FIG. 1c according to the magnitude of the electric resistance value.

More specifically, for example, in a case where the power supply device 8 functions as a DC power supply device, a terminal 8a is a positive terminal, and a terminal 8b is a negative terminal, the current I flows from the positive terminal 8a, reaches an upper portion of one side wall (electrode) 6a of the electrode body 6, then flows into the molten metal M present in the filter 3 and having a smaller electric resistance value than the side wall (electrode) 6a, flows in the molten metal M leftward in FIG. 1c, then reaches an upper portion of the other side wall (electrode) 6b, and eventually returns from the negative terminal 8b to the power supply device 8. Note that, in FIG. 1c, illustration of the filter 3 is omitted in order to make the figure easily viewable.

As can be seen particularly from FIG. 1b, the external member 4B is disposed at a position in a lower portion of the outside of the molten metal conveyance gutter 1 to vertically face the internal member 4A. The external member 4B is substantially a magnetic field device, and can be made of a permanent magnet or an electromagnet. In the external member (magnetic field device) 4B, an upper portion is magnetized to the N pole, and a lower portion is magnetized to the S pole (or conversely, the upper portion is magnetized to the S pole, and the lower portion is magnetized to the N pole). Thus, as can be seen particularly from FIG. 1c, the lines of magnetic force ML coming out from the external member (magnetic field device) 4B penetrate the molten metal conveyance gutter 1 and the electrode body 6 from the lower side to the upper side of the figure, and penetrate the molten metal M in the electrode body 6. The lines of magnetic force ML intersect with the current I that runs laterally (leftward) in FIG. 1c described above. Thus, the Lorentz force F acts on the molten metal M, and the molten metal M is driven along the arrows AR as illustrated in FIG. 1a. Here, the Lorentz force F is not applied to most impurity particles because the impurity particles are non-conductive. Accordingly, referring to FIG. 1a, for example, on the upstream side of the filter device 4, the Lorentz force F is applied only to the molten metal M, and the Lorentz force F is not applied to most impurity particles. Therefore, owing also to the presence of the filter 3, substantially only the molten metal M passes through the filter device 4. That is, even when the Lorentz force F is applied, the force F is not applied to most impurity particles. Therefore, although the Lorentz force F is applied, most impurity particles are substantially prevented from passing through the filter device 4 by the Lorentz force F.

By the Lorentz force F, the molten metal M flows into the filter 3 while being pushed in a pressurized state. Thus, impurity particles in the molten metal M are trapped in a state of being substantially dispersed uniformly in the entire filter 3 in the thickness direction. Thus, the filter 3 is clogged more slowly, and can be used without replacement for a longer period of time.

The above operation and other operations of the molten metal purification device will be described in more detail.

As can be seen particularly from FIG. 1c, the current I from the power supply device 8 runs laterally in the figure in the molten metal M and intersects with the lines of magnetic force ML coming out from the magnetic field device 4B. The Lorentz force F thus obtained drives the molten metal M in the arrow AR direction illustrated in FIG. 1a. By the Lorentz force F, the molten metal M is pushed into the filter 3 in a pressurized state, and impurity particles in the molten metal M are trapped over the entire thickness direction of the filter 3. Thus, impurity particles are trapped in the entire filter 3, so that so-called clogging can be delayed. Thus, the time until the entire filter 3 is clogged is lengthened, and the operation can be continued for a longer time.

Moreover, after clogging, the Lorentz force F is applied in a direction opposite to the arrow AR direction by causing the current I to flow through the filter 3 in the direction opposite to the above direction while the filter 3 is attached to the electrode body 6 (molten metal conveyance gutter 1), so that the molten metal can be caused to flow backward to separate and remove the impurity particles from the filter 3 and the filter 3 can be reproduced as it is called. Alternatively, by detaching only the filter 3 or the filter 3 together with the electrode body 6 from the molten metal conveyance gutter 1 and incorporating the same into a reproduction device having a configuration substantially shown in FIGS. 1a and 1b provided in a separate tank, container, or the like (housing body), the filter 3 can be reproduced by removing impurity particles from the filter 3 as described above.

The driving of the molten metal M by the filter device 4 will be described in more detail.

It is possible to adjust the speed of the molten metal M passing through the filter 3 by adjusting the magnitude of the Lorentz force F by adjusting the value of the current I flowing from the power supply device 8. For example, when the value of the current I is increased, the filtration speed can be increased to shorten the time required for filtration. Moreover, since the filtration capability is improved by the Lorentz force F, the size can be reduced as compared with a conventional device having the same filtration capacity.

The value of the current I can be adjusted according to various parameters. That is, for example, even in a case where various parameters such as the viscosity of the molten metal M due to the type, temperature, or the like of the target molten metal M, the temperature of the molten metal conveyance gutter 1 due to the weather or climate, the flowability of the molten metal M in the molten metal conveyance gutter 1, the material of the filter 3, the size of the mesh of the filter 3, and the thickness of the filter 3 change, it is possible to perform various adjustments such as maintaining the speed at which the molten metal M passes through the filter 3 constant, or advancing or slowing the speed by adjusting the value of the current I.

The magnitude of the Lorentz force F applied to the molten metal M can be also adjusted by changing the magnetic field intensity of the magnetic field device 4B instead of changing the value of the current I. That is, in a case where the magnetic field device 4B is a permanent magnet, the Lorentz force F can be adjusted by replacing the magnetic field device 4B with another magnetic field device 4B having a different magnetic field intensity. Moreover, as can be seen from FIG. 1c, the Lorentz force F can also be adjusted by making a configuration in which the relative vertical distance between the molten metal conveyance gutter 1 and the magnetic field device 4B made of a permanent magnet is adjustable, and adjusting the relative vertical distance as necessary. Moreover, in a case where an electromagnet is used as the magnetic field device 4B, the Lorentz force F can be adjusted by changing the supply current.

Moreover, the molten metal purification device according to the embodiment of the present invention may be subjected to a test operation before actual operation, and the filter 3 after the test operation may be observed to find a trap state of the impurity particles in the filter 3, that is, to what thickness of the filter 3 the impurity particles enter, thereby inductively obtaining an appropriate current value, and then the actual operation may be performed.

Moreover, when the polarities of the terminals 8a and 8b in the power supply device 8 are switched, the flowing direction of the molten metal M can be made opposite to the arrow AR direction in FIG. 1a. As will be described later, this can be employed to trap impurity particles in the filter 3 uniformly in the entire thickness direction of the filter 3 or to reproduce the filter 3 after use.

Furthermore, when the power supply device 8 is used as an AC current device, the molten metal M alternately flows or attempts to flow in the arrow AR direction and the opposite direction as can be seen from FIG. 1a. When the frequency of the AC current is set to, for example, 1 to 5 Hz or the like, the molten metal M moves as if vibrating. Thereafter, if the Lorentz force F is set to the arrows AR, impurity particles in the molten metal M can enter a deeper portion of the filter 3 and be trapped. Moreover, if the Lorentz force F is applied in a direction opposite to the arrow AR direction, the impurities once trapped in the filter 3 can be separated from the filter 3 and cleaned with easier removal. At this time, the molten metal M containing a large amount of separated impurity particles may be appropriately collected and discarded. As described above, by allowing the AC current to flow, the impurity particles can be trapped in a deeper portion of the filter 3, or the impurity particles once trapped can be easily separated from the filter 3. At the time of such cleaning, as the current from the power supply device 8, a current larger than the current at the time of filtration, for example, a current of approximately 2 to 3 times may be made to flow. Furthermore, a pulse current is more effective.

After the impurity particles are trapped in the entire filter 3 by the operation of the filter device 4, the old filter 3 in which many impurity particles are trapped may be detached from the electrode body 6 and replaced with a new filter 3. Alternatively, the filter 3 can be detached from the molten metal conveyance gutter 1 together with the electrode body 6 that houses and supports the filter 3, and replaced. This is because not only the filter 3 but also the electrode body 6 may be consumed by the operation for a certain period of time.

Moreover, as described above, in place of replacement of the filter 3 and the like, an old filter 3 that has been subjected to trapping can be reproduced and reused in a state of being attached to the electrode body 6. That is, when the filter 3 is operated as described above while being installed in the electrode body 6 (molten metal conveyance gutter 1), impurity particles trapped in the filter 3 can be removed from the filter 3.

The molten metal purification device according to the embodiment of the present invention described above can be operated safely even in a case where the amount of the molten metal M in the molten metal conveyance gutter 1 has decreased (in a case where the height of the liquid level FL of the molten metal M has decreased, refer to FIG. 1c). Accordingly, for example, the device can be used not only in a case where the mold is used in a continuous operation mode but also in a case where the mold is used in an intermittent operation mode. That is, in the intermittent operation mode, the amount of the molten metal M gradually decreases in the conveyance path 1a of the molten metal conveyance gutter 1 each time, the liquid level FL lowers, and finally, the molten metal M is not present at all. Even in a case where the molten metal M is not present at all, the flow path of the current I is automatically switched to the illustrated flow path as can be seen from FIG. 1d. That is, the current I appropriately flows across the electrodes 6a and 6b through the bottom wall 6c of the electrode body 6, and no discharge occurs. Accordingly, even if means for safe operation is not particularly adopted, it is possible to achieve safe operation without causing a large accident or the like. In particular, since there are many molten metal M having a temperature of approximately 1000° C., this feature is extremely useful on site from the viewpoint of worker safety.

Figure 1D:
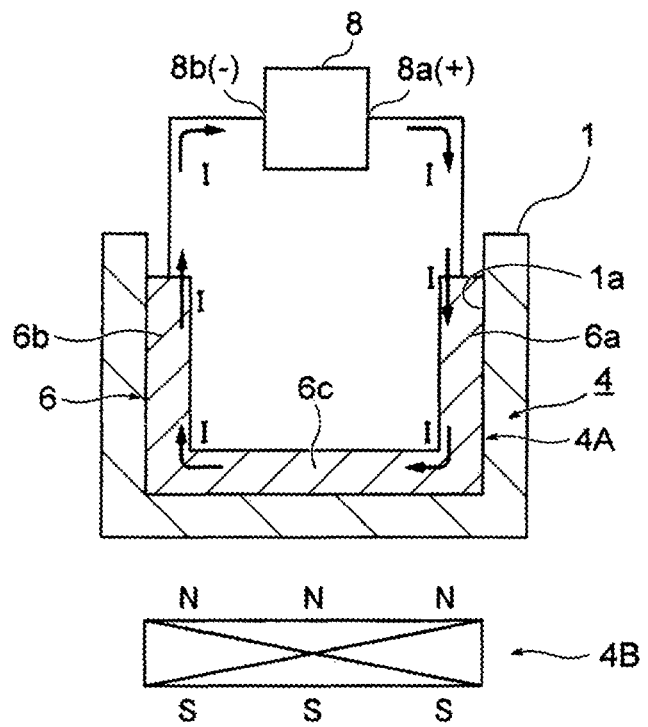
FIG. 1d is an explanatory view illustrating another aspect in which current I flows in the molten metal purification device according to the first embodiment of the present invention.
Figure 1E:
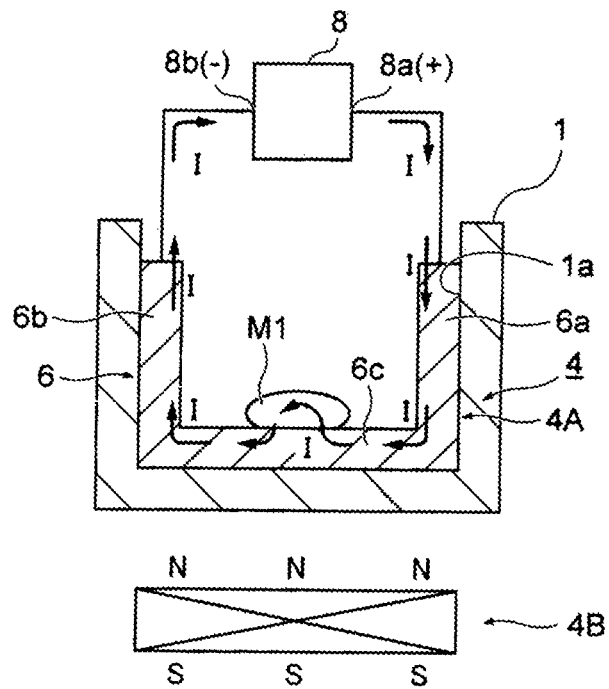
FIG. 1e is an explanatory view illustrating still another aspect in which current I flows in the molten metal purification device according to the first embodiment of the present invention.

Moreover, as can be seen from FIG. 1e, in a case where a small amount of the molten metal M remains on the bottom face of the electrode body 6, the current I flows from one side of the bottom wall 6c into the remaining molten metal M1 and flows again to the other side of the bottom wall 6c as illustrated in the figure. The current I in the remaining molten metal M1 intersects with the lines of magnetic force ML coming out from the magnetic field device 4B to generate Lorentz force. Thus, the remaining molten metal M1 is also reliably conveyed toward a conveyance destination device in the next stage owing also to the inclination of the molten metal conveyance gutter 1.

As the filter 3 used in the above-described molten metal purification device, a commercially available filter can be used, and not only the range of selection of constituent members of the device is wide, but also the cost can be suppressed at low cost.

As described above, for example, as illustrated in FIGS. 6a and 6b, a general-purpose single-layer filter 3 made of ceramics can be used as the filter 3.

Figure 7A:
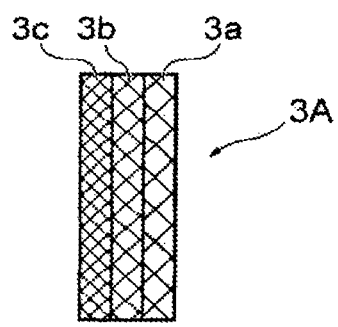
FIG. 7a is a plan view illustrating another example of a filter used in the first and second embodiments.
Figure 7B:
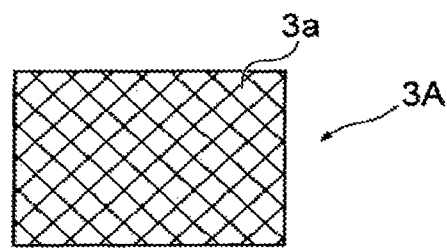

Moreover, a multi-layer filter 3A illustrated in FIGS. 7a and 7b can also be used as the filter. Although a three-layer type is used in these figures, the present invention is not particularly limited to the three-layer type. The filter 3A in FIGS. 7a and 7b has a three-layer structure in which the first layer is a coarse filter unit 3a on the molten metal inflow side, the second layer is a middle filter unit 3b in the middle, and the third layer is a fine filter unit 3c on the outflow side. That is, the filter 3A can be configured by a plurality of filter units with the mesh size gradually decreasing from the inflow side toward the outflow side. When such a filter 3A is used, small impurity particles pass through the first and second layers and are trapped in the third layer, middle impurity particles pass through the first layer and are trapped in the second layer, and large impurity particles are trapped in the first layer. Thus, owing also to the application of the Lorentz force F, impurity particles can be trapped more uniformly in the entire thickness of the filter 3A, and the molten metal M from which impurities have been removed can be sent to, for example, a mold in the next stage or the like with higher accuracy.

Moreover, even in the multi-layer filter, the mesh size does not necessarily need to increase from one surface to the other surface of the filter as described above. In some cases, the mesh size can also be freely set in each layer (each unit).

Note that a so-called clogging state cannot be avoided after sufficiently trapping impurities even in the filter 3A having the multi-layer structure as described above. At this time, in the device according to the embodiment of the present invention, even the filter 3A can perform a so-called reproduction operation of removing impurities to eliminate the clogging state. This reproduction is performed by, for example, causing the molten metal M to flow through the filter 3A in a direction opposite to the previous direction by the Lorentz force F as in the filter 3 having a single-layer structure. That is, as described above, the impurities are trapped in the fine filter unit 3c, the middle filter unit 3b, and the coarse filter unit 3a according to the size of the particles. Therefore, in this reproduction work, by causing the molten metal M to flow in the filter 3A in the opposite direction, impurity particles having any of a small diameter, a middle diameter, and a large diameter reliably pass through the mesh of the filter units 3a, 3b, and 3c of the filter 3A in the opposite direction and are removed from the filter 3A.

Although an example in which the present invention is applied to the molten metal conveyance gutter 1 has been described in the above description, the object to be applied is not limited to the molten metal conveyance gutter 1. For example, the present invention can also be applied to a case where a container or the like (housing body) for purifying molten metal M or reproducing a filter once clogged is disposed separately.

Although a molten metal purification device according to the first embodiment has been described above, the operation, action, advantage, and the like of these descriptions are similarly applied to molten metal purification devices according to the second and subsequent embodiments as long as there is no technical contradiction. Moreover, the description in each of the second and subsequent embodiments is also applicable to former embodiments as long as there is no technical contradiction.

Second Embodiment

Figure 2A:
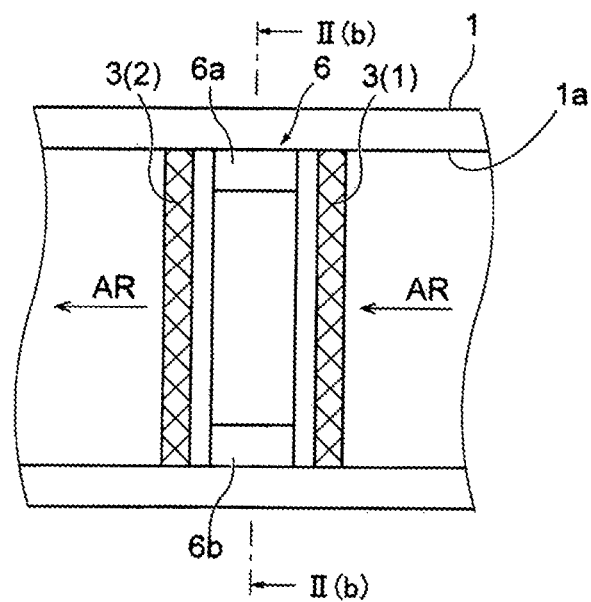
FIG. 2a is a plan view of a molten metal purification device according to a second embodiment of the present invention.
Figure 2B:
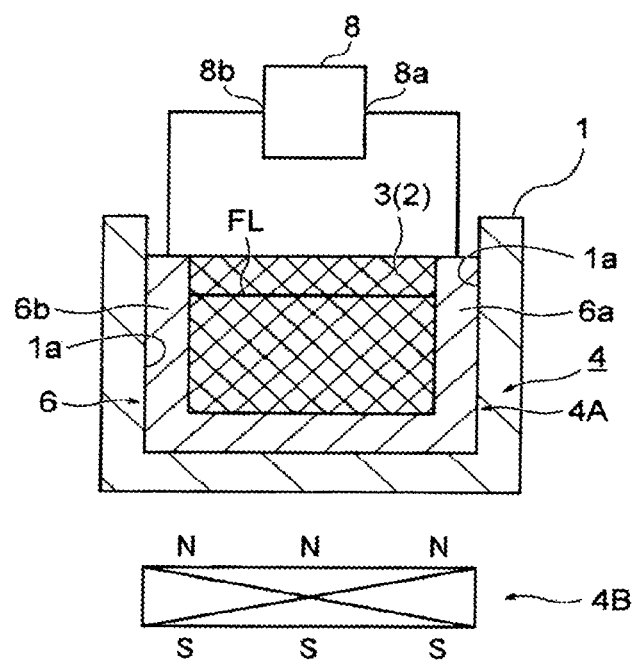

FIGS. 2a and 2b are respectively a plan view of a molten metal purification device according to a second embodiment of the present invention, and an explanatory sectional view taken along line II(b)-II(b) in FIG. 2a.

The second embodiment is different from the first embodiment in that two filters 3(1) and 3(2) are used as the filter 3 made of a non-magnetic material, an electrode body 6 is sandwiched between the two filters 3(1) and 3(2) with a gap interposed therebetween instead of attaching two filters 3(1) and 3(2) to the electrode body 6, and thereby a pair of side walls (electrodes) 6a and 6b directly face each other in the width direction only with the molten metal M interposed therebetween as described later. The other configuration is substantially similar to that of the first embodiment. Accordingly, detailed description of the configuration will be omitted.

In the second embodiment, no filter is present between the pair of electrodes 6a and 6b facing each other in the width direction of the electrode body 6. Therefore, the pair of side walls (electrodes) 6a and 6b directly face each other in the width direction with only the molten metal M interposed therebetween. Therefore, the current I flowing from one electrode 6a to the other electrode 6b through the molten metal M efficiently flows at high density. According to experiments by the present inventor, the current I flowing across the pair of electrodes 6a and 6b was much larger than expected before the experiments, as compared with the example illustrated in FIG. 1a and the like. Thus, the Lorentz force F obtained by the intersection of the current I and the lines of magnetic force ML was larger than expected. The Lorentz force F can be obtained in either the forward direction (arrow AR) or the opposite direction with respect to the flow of the molten metal M, and the Lorentz force F can be caused to work as useful force as described above in a case where the Lorentz force F is obtained in either direction.

That is, it is obvious that the device of the second embodiment operates as in the case of the device of the first embodiment described above, and can perform uniform trapping of impurity particles to the filters 3(1) and 3(2), purification by separation from the filters 3(1) and 3(2), and the like by the Lorentz force F. It is also obvious that a filter 3A including a plurality of filter units as illustrated in FIGS. 7a and 7b can be used instead of the filter 3 in FIGS. 6a and 6b as each of the filters 3(1) and 3(2) in the second embodiment.

Furthermore, two filters 3(1) and 3(2) are used in the second embodiment. Therefore, for example, after use for a certain period of time, the positions of the filter 3(1) and the filter 3(2) can be exchanged with each other. Thus, the trap state of impurity particles to each of the filters 3(1) and 3(2) is made uniform, and the filters sometimes can be used for a longer period of time without especially performing the purification treatment of the filter. Moreover, only one of the two filters 3(1) and 3(2) that has trapped more impurity particles can be replaced with a new filter.

Third Embodiment

Figure 3A:
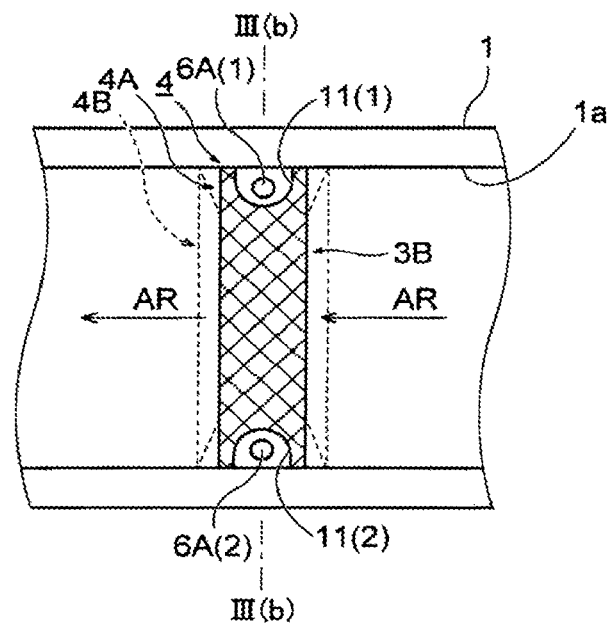
FIG. 3a is a plan view of a molten metal purification device according to a third embodiment of the present invention.
Figure 3B:
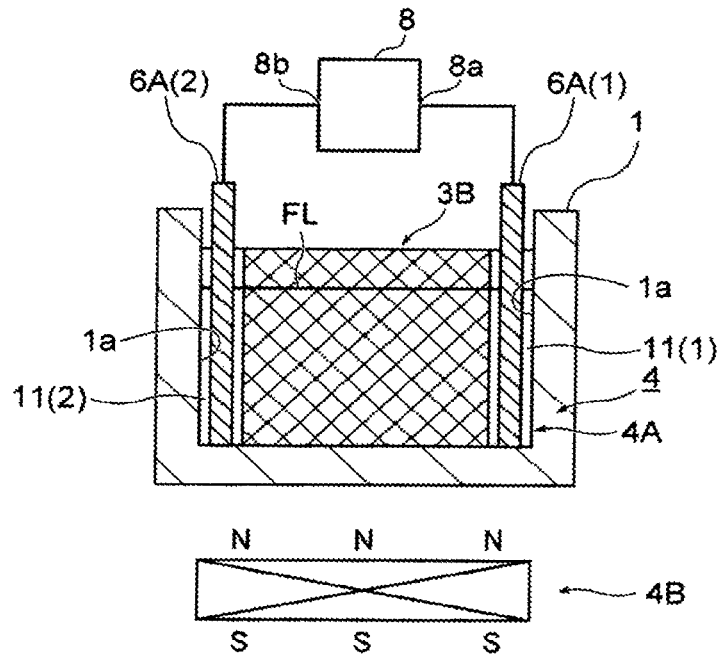

FIGS. 3a and 3b are respectively a plan view of a molten metal purification device according to a third embodiment of the present invention, and an explanatory view of an end face taken along line III(b)-III(b) in FIG. 3a.

The third embodiment is different from the first embodiment in that two separate electrodes 6A(1) and 6A(2) are used instead of the U-shaped integrated electrode body 6 illustrated in FIG. 1d and the like, electrode housing spaces 11(1) and 11(2) for housing the electrodes 6A(1) and 6A(2) with gaps are formed at both ends in the width direction of a non-magnetic filter 3B, and the like. The filter 3B is detachably housed in a molten metal conveyance gutter 1. The other configuration is substantially similar to that of the first embodiment and the like. Accordingly, detailed description of the configuration will be omitted.

Figure 8A:
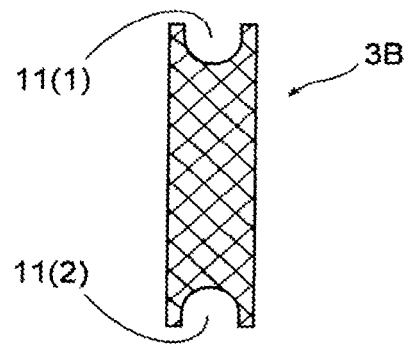
FIG. 8a is a plan view illustrating an example of a filter used in the third embodiment.
Figure 8B:
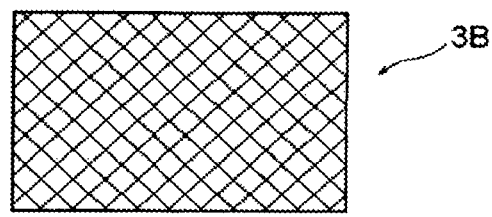

FIG. 8a is a plan view of the filter 3B, and FIG. 8b is a side view thereof.

Figure 9A:
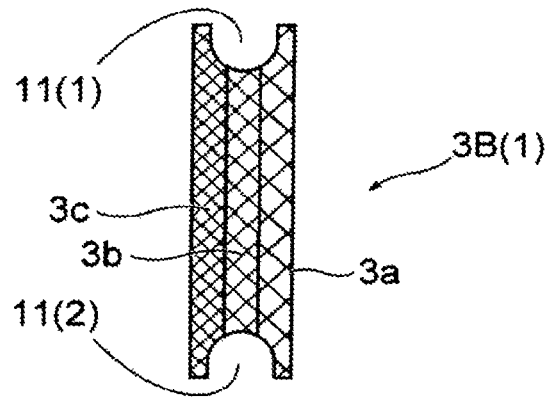
FIG. 9a is a plan view illustrating another example of a filter used in the third embodiment.
Figure 9B:
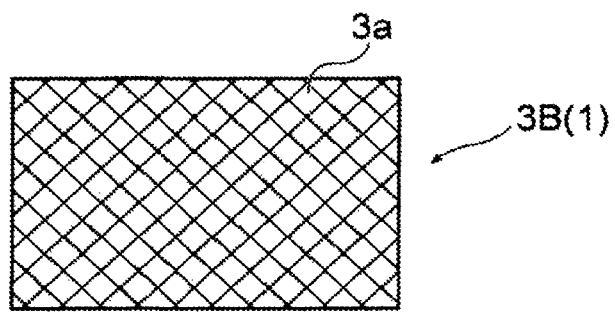

Moreover, a filter 3B(1) including a plurality of filter units can be used as the filter 3B. FIG. 9a is a plan view of the filter 3B(1), and FIG. 9b is a right side view thereof. In this example, the filter 3B(1) is configured as a multi-layer filter similar to that illustrated in FIGS. 7a and 7b. The filter 3B(1) has a configuration similar to that of the filter 3 in FIGS. 7a and 7b except that the filter 3B(1) includes electrode housing spaces 11(1) and 11(2) at both ends in the width direction, and thus detailed description will be omitted.

In the third embodiment, when current I flows from a power supply device 8 in the presence of the molten metal M, the current I flows from one electrode 6A(1) to the other electrode 6A(2) through the molten metal M that has entered the mesh of the filters 3B and 3B(1) as in the first embodiment. Since the operation and the like according to this are similar to those of the first embodiment, detailed description will be omitted.

In the third embodiment, since no electrode body is provided, the structure is simple, the manufacture, the maintenance, and the like are easy, and the third embodiment can be obtained at low cost.

Fourth Embodiment

Figure 4A:
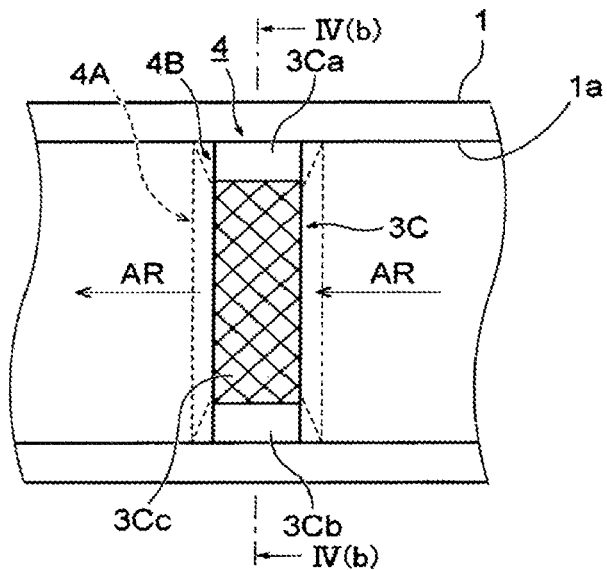
FIG. 4a is a plan view of a molten metal purification device according to a fourth embodiment of the present invention.
Figure 4B:
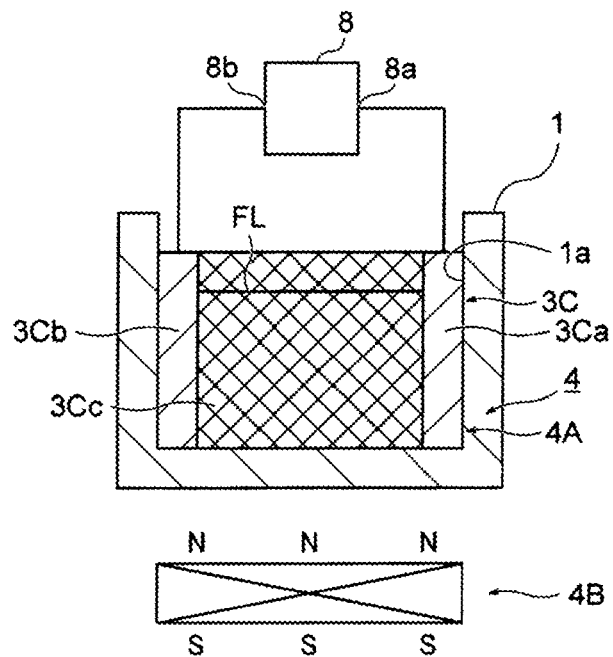

FIGS. 4a and 4b are respectively a plan view of a molten metal purification device according to a fourth embodiment of the present invention, and an explanatory sectional view taken along line IV(b)-IV(b) in FIG. 4a.

The fourth embodiment is different from the first embodiment described above in that a filter body 3Cc is made of a conductor material, the electric resistance value of the filter body 3Cc is smaller than the electric resistance value of the target molten metal, the filter body 3Cc is supported by filter support frames (electrodes) 3Ca and 3Cb on the left and right in the width direction to form a filter 3C, the filter 3C is detachably housed in the molten metal conveyance gutter 1, and the like. Also in the fourth embodiment, the other configuration is substantially similar to that of the first embodiment and the like. Accordingly, detailed description will be omitted.

Figure 10A:
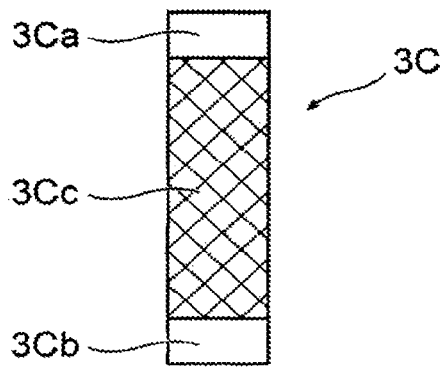
FIG. 10a is a plan view illustrating an example of a filter used in the fourth embodiment.
Figure 10B:
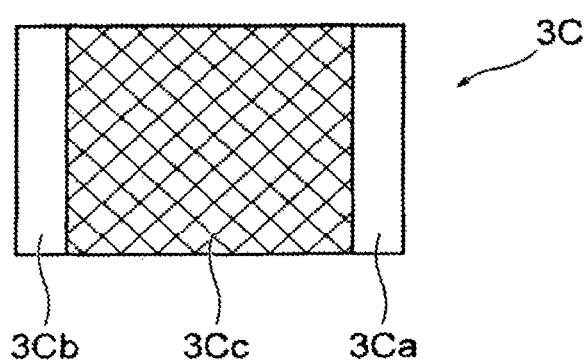

As described above, as can be seen from the plan view of FIG. 10a and the side view of FIG. 10b, the filter 3C has the pair of filter support frames (electrodes) 3Ca and 3Cb at both ends in the width direction, and the filter body 3Cc supported thereby. Both of the filter support frames 3Ca and 3Cb and the filter body 3Cc are made of a conductive material having heat resistance and fire resistance.

In the fourth embodiment, current I flows as follows depending on the presence or absence of the molten metal M.

First, in a case where the molten metal M is not present, the current I flows through a flow path extending from one positive terminal 8a of a power supply device 8 to the other negative terminal 8b through the one filter support frame 3Ca, the filter body 3Cc, and the other filter support frame 3Cb of the filter 3C, for example. At this time, the filter body 3Cc self-heats due to Joule heat, and has a function of preventing a decrease in temperature and solidification of the molten metal M and the like.

Moreover, in a case where the molten metal M is present, the molten metal M is located at each small mesh of the filter body 3Cc. Therefore, due to the fact that the electric resistance value of the molten metal M is smaller than the electric resistance value of the filter body 3Cc, the current I flows from the conductive member constituting the filter body 3Cc to the molten metal M in the mesh, then reaches again the conductive member of the filter body 3Cc, sequentially repeats this, and flows from the one filter support frame 3Ca to the other filter support frame 3Cb.

The size (aperture) of the mesh of the filter 3C can be, for example, 0.1 to 0.2 mm$\phi$. Thus, in the process of the flow of the current I, the current I concentrates on the molten metal M present in the mesh as a minute space, so that the current density increases, and as a result, the electromagnetic force (Lorentz force) per unit weight of the molten metal increases, and advantages such as suppression of clogging of the filter 3C and improvement of the backwashing effect can be obtained.

That is, in the presence of the molten metal M, the current I flows through the molten metal M existing in the mesh of the filter body 3Cc as described above, and the current I intersects with the lines of magnetic force ML coming out from a magnetic field device 4B located below. Thus, the Lorentz force F is generated. By the Lorentz force F, the molten metal M is driven as indicated by the arrows AR as in the case of the first embodiment described above. The other operation is substantially similar to the case of the first embodiment and the like, and thus detailed description will be omitted.

Fifth Embodiment

Figure 5A:
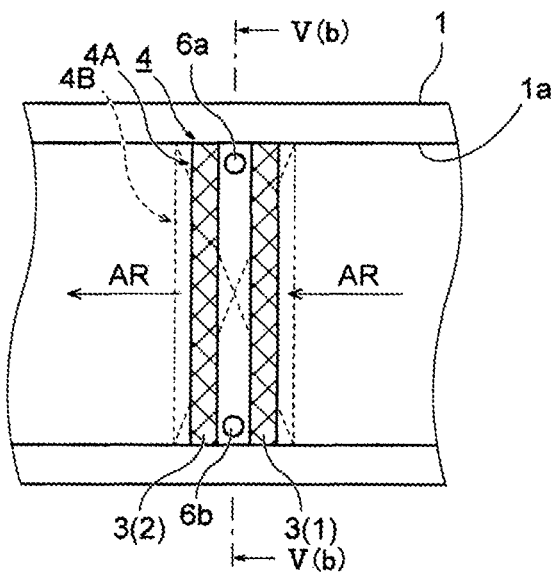
FIG. 5a is a plan view of a molten metal purification device according to a fifth embodiment of the present invention.
Figure 5B:
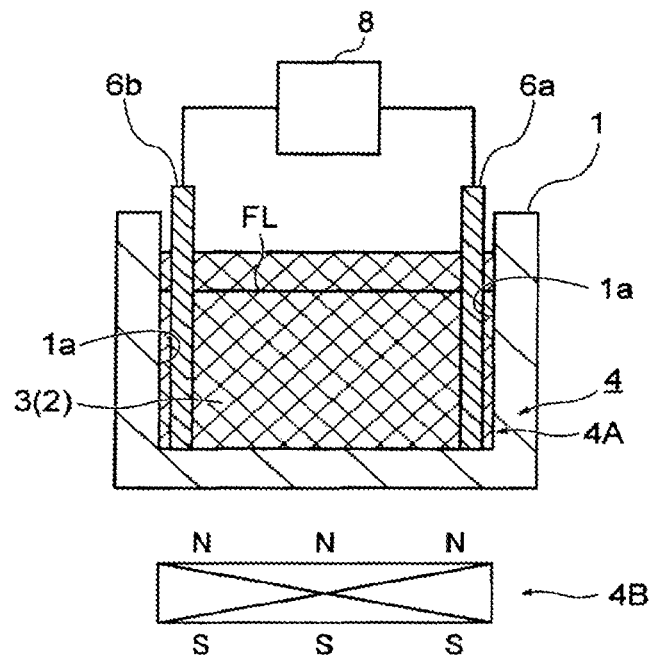

FIGS. 5a and 5b are respectively a plan view of a molten metal purification device according to a fifth embodiment of the present invention, and an explanatory sectional view taken along line V(b)-V(b) in FIG. 5a.

In the fifth embodiment, two filters 3(1) and 3(2) made of a non-magnetic material are used as filters as in the second embodiment described above. The difference from the second embodiment is that a substantially U-shaped electrode body 6 is used in the second embodiment, while a pair of electrodes 6a and 6b separate from each other is used in the fifth embodiment. The other configuration is substantially similar to that of the second embodiment. Accordingly, detailed description will be omitted.

The operation in the fifth embodiment is substantially similar to that in the second embodiment. That is, in the fifth embodiment, the pair of electrodes 6a and 6b directly face each other in the width direction only with the molten metal M interposed therebetween. Therefore, current I flows across these electrodes 6a and 6b at high density. The other operation is substantially similar to the case of the second embodiment, and thus detailed description will be omitted.

The embodiments described above offer the following advantages and the like.
(1) The first embodiment can also cope with intermittent molten metal purification (batch type). This is because no spark occurs.
(2) A large impurity removal capability is obtained. In particular, this is remarkable in the case of the multi-layer filter 3A in FIGS. 7a and 7b.
(3) The filter can be easily replaced.
(4) The life of the filter can be greatly extended (e.g., 2 to 3 times or the like in comparison with conventional life).

Thus, the running cost can be greatly reduced.
(5) Downtime due to filter replacement can be greatly reduced.
(6) In the fourth embodiment, when the filter body 3Cc is energized and heated in advance, self-heat is generated, so that it is unnecessary to preheat the filter body 3Cc.
(7) In the fourth embodiment, a decrease in the temperature of the molten metal M can be suppressed.
(8) The filter can be repeatedly used.
(9) When multi-layer filters having different mesh sizes illustrated in FIGS. 7a, 7b, 9a, and 9b are used, a margin of a particle size of impurity particles to be trapped can be widened.
(10) In a case where a channel steel-type electrode body is used, the electrode body itself is heated to a high temperature by heating and heat generation if the electrode body is previously energized before actual operation, and therefore, even if a high-temperature molten metal suddenly flows thereafter, heat shock does not occur, and breakage of the electrode can be prevented.

REFERENCE SIGNS LIST

1 Molten metal conveyance gutter (molten metal flow body)
1a Conveyance path (flow path)
3, 3A, 3B, 3C Filter
3a Coarse filter unit
3b Middle filter unit
3c Fine filter unit
3Ca, 3Cb Filter support frame (electrode)
3Cc Filter body
4 Filter device
4A Internal member
4B Magnetic field device (external member)
6 Electrode body
6a Electrode (side wall)
6A(1), 6A(2) Electrode
6b Electrode (side wall)
6c Bottom wall
8 Power supply device
8a, 8b Terminal
F Lorentz force
FL Liquid level
I Current
M, MI Molten metal
ML Lines of magnetic force

The invention claimed is:

1. A molten metal purification device for purifying molten metal flowing through a molten metal flow body in which a flow path through which molten metal to be purified flows is formed by a pair of side walls opposed to each other in a width direction and a bottom wall connecting the side walls, wherein
the molten metal purification device comprises an internal member provided inside the molten metal flow body, and an external member provided outside the molten metal flow body,
the internal member includes:
a non-conductive filter that is provided inside the flow path; and
an electrode body provided inside the flow path, the electrode body being made of a conductive member having an electric resistance value larger than an electric resistance value of molten metal to be purified, the electrode body having a pair of electrodes facing each other in a width direction of the molten metal flow body and a bottom wall connecting the electrodes, the electrode body being configured such that current flows across the pair of electrodes through the molten metal to be purified, and
the external member is configured as a magnetic field device having an upper surface side magnetized to an N pole or an S pole, and is disposed entirely below the molten metal flow body so that lines of magnetic force coming out from the N pole or lines of magnetic force entering the S pole intersect with current flowing across the pair of electrodes to generate Lorentz force for driving the molten metal to be purified passing through the filter in a direction along a flowing direction in the flow path.

2. The molten metal purification device according to claim 1, wherein the molten metal flow body is a molten metal conveyance gutter for conveying molten metal, or a housing body for purifying molten metal.

3. The molten metal purification device according to claim 1, wherein the filter is configured to be attachable to and detachable from the molten metal flow body.

4. The molten metal purification device according to claim 3, wherein the filter includes a plural-layer filter unit.

5. The molten metal purification device according to claim 4, wherein a pair of adjacent filter units in a plural-layer filter unit in the filter is disposed such that a mesh of a filter unit on an outflow side of the molten metal is smaller than a mesh of a filter unit on an inflow side.

6. The molten metal purification device according to claim 1, wherein the filter includes a single-layer filter unit.

7. The molten metal purification device according to claim 1, wherein the external member is made of a permanent magnet or an electromagnet.

8. The molten metal purification device according to claim 1, wherein the molten metal purification device further comprises a power supply device that supplies current to the pair of electrodes, wherein the power supply device is a DC current source configured to supply a pulse current with variable supply power, or an AC current source with variable supply power and variable frequency.

9. The molten metal purification device according to claim 1, wherein the filter is housed in a filter housing space formed by the pair of electrodes and the bottom wall.

10. The molten metal purification device according to claim 1, wherein the filter includes a pair of non-conductive filters provided inside the flow path, the pair of non-conductive filters being provided at positions spaced apart from each other in a flow direction in the flow path so as to sandwich the electrode body.

* * * * *